(12) United States Patent
Zednicek

(10) Patent No.: US 8,582,278 B2
(45) Date of Patent: Nov. 12, 2013

(54) SOLID ELECTROLYTIC CAPACITOR WITH IMPROVED MECHANICAL STABILITY

(75) Inventor: Stanislav Zednicek, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 278 days.

(21) Appl. No.: 13/045,584

(22) Filed: Mar. 11, 2011

(65) Prior Publication Data

US 2012/0229956 A1  Sep. 13, 2012

(51) Int. Cl.
*H01G 4/228* (2006.01)
*H01G 9/00* (2006.01)

(52) U.S. Cl.
USPC ............ 361/540; 361/523; 361/532; 361/533

(58) Field of Classification Search
None
See application file for complete search history.

(56) References Cited

U.S. PATENT DOCUMENTS

| | | | |
|---|---|---|---|
| 3,345,545 | A | 10/1967 | Bourgault et al. |
| 4,085,435 | A | 4/1978 | Galvagni |
| 4,945,452 | A | 7/1990 | Sturmer et al. |
| 5,198,968 | A | 3/1993 | Galvagni |
| 5,357,399 | A | 10/1994 | Salisbury |
| 5,394,295 | A | 2/1995 | Galvagni et al. |
| 5,457,862 | A | 10/1995 | Sakata et al. |
| 5,473,503 | A | 12/1995 | Sakata et al. |
| 5,495,386 | A | 2/1996 | Kulkarni |
| 5,729,428 | A | 3/1998 | Sakata et al. |
| 5,812,367 | A | 9/1998 | Kudoh et al. |
| 5,949,639 | A | 9/1999 | Maeda et al. |
| 6,191,936 | B1 | 2/2001 | Webber et al. |
| 6,197,252 | B1 | 3/2001 | Bishop et al. |

(Continued)

FOREIGN PATENT DOCUMENTS

| | | |
|---|---|---|
| EP | 09660071 A1 | 12/1999 |
| JP | 2002043175 A | 2/2002 |

(Continued)

OTHER PUBLICATIONS

Search Report for GB1203807.1 dated Jul. 9, 2012, 4 pages.

(Continued)

*Primary Examiner* — Jayprakash N Gandhi
*Assistant Examiner* — Dion Ferguson
(74) *Attorney, Agent, or Firm* — Dority & Manning, P.A.

(57) ABSTRACT

A capacitor containing a solid electrolytic capacitor element that includes an anode, dielectric, and a cathode that includes a solid electrolyte is provided. An anode lead extends from the anode and is electrically connected to an anode termination. Likewise, a cathode termination is electrically connected to the cathode. The cathode termination contains an upstanding portion that is oriented generally perpendicular to the lower surface of the capacitor element, and first and second planar portions that are oriented generally parallel to the lower surface of the capacitor. The first and second planar portions are interconnected by a folded region so that the first portion is positioned vertically above the second portion. Thus, after encapsulating the capacitor element with a molding material, the second planar portion remains exposed for subsequent connection to an electrical component. However, due to its higher vertical position, the first planar portion can be completely encapsulated by the molding material. In addition, the upstanding portion of the cathode termination is also substantially encapsulated by the molding material. By encapsulating both planar and upstanding portions of the cathode termination with the molding material, the present inventors have discovered that the likelihood of delamination is reduced even if a portion of the molding material cracks. This improves mechanical stability and electrical performance.

11 Claims, 3 Drawing Sheets

(56) References Cited

U.S. PATENT DOCUMENTS

| | | |
|---|---|---|
| 6,236,561 B1 * | 5/2001 | Ogino et al. ............... 361/523 |
| 6,322,912 B1 | 11/2001 | Fife |
| 6,391,275 B1 | 5/2002 | Fife |
| 6,416,730 B1 | 7/2002 | Fife |
| 6,519,135 B2 | 2/2003 | Sano et al. |
| 6,527,937 B2 | 3/2003 | Fife |
| 6,576,099 B2 | 6/2003 | Kimmel et al. |
| 6,592,740 B2 | 7/2003 | Fife |
| 6,616,713 B2 | 9/2003 | Sano et al. |
| 6,639,787 B2 | 10/2003 | Kimmel et al. |
| 6,674,635 B1 | 1/2004 | Fife et al. |
| 6,882,521 B2 | 4/2005 | Tsutsui et al. |
| 6,903,922 B2 | 6/2005 | Sano et al. |
| 6,920,037 B2 * | 7/2005 | Sano et al. ............... 361/540 |
| 7,116,548 B2 | 10/2006 | Satterfield, Jr. et al. |
| 7,220,397 B2 | 5/2007 | Kimmel et al. |
| 7,262,511 B2 | 8/2007 | Osako et al. |
| 7,341,705 B2 | 3/2008 | Schnitter |
| 7,352,561 B2 | 4/2008 | Nakamura |
| 7,381,396 B2 | 6/2008 | Thomas et al. |
| 7,419,926 B2 | 9/2008 | Schnitter et al. |
| 7,515,396 B2 | 4/2009 | Biler |
| 7,532,457 B2 * | 5/2009 | Dvorak et al. ............... 361/528 |
| 7,542,267 B2 | 6/2009 | Ishijima |
| 7,974,077 B2 | 7/2011 | Matsuoka et al. |
| 8,325,466 B2 * | 12/2012 | Fujii et al. ............... 361/540 |
| 2009/0147449 A1 * | 6/2009 | Matsuoka et al. ............... 361/540 |
| 2009/0231784 A1 | 9/2009 | Matsuoka et al. |
| 2010/0103591 A1 | 4/2010 | Fujii et al. |
| 2010/0110615 A1 * | 5/2010 | Nishimura et al. ............... 361/528 |
| 2011/0205689 A1 | 8/2011 | Vilcová |

FOREIGN PATENT DOCUMENTS

| | | |
|---|---|---|
| JP | 2008053513 A | 3/2003 |
| JP | 2006190925 A | 7/2006 |
| JP | 2008153702 A | 7/2008 |

OTHER PUBLICATIONS

Related US Application Form.

* cited by examiner

SOLID ELECTROLYTIC CAPACITOR WITH IMPROVED MECHANICAL STABILITY

BACKGROUND OF THE INVENTION

Solid electrolytic capacitors (e.g., tantalum capacitors) have been a major contributor to the miniaturization of electronic circuits and have made possible the application of such circuits in extreme environments. Many conventional solid electrolytic capacitors are formed with terminations that can be surface mounted onto a printed circuit board. Anode terminations, for example, may contain a portion that is bent upwardly toward the capacitor and welded to a wire extending from the anode. Cathode terminations may likewise contains a flat portion that receives the bottom surface of the capacitor element. One problem with such conventional solid electrolytic capacitors, however, is that outgassing can sometimes cause cracks to occur within the molded material, which may lead to mechanical stability and partial delamination of the cathode termination from the capacitor element. As such, a need currently exists for an improved solid electrolytic capacitor assembly.

SUMMARY OF THE INVENTION

In accordance with one embodiment of the present invention, a capacitor is disclosed that comprises a solid electrolytic capacitor element, an anode termination, a cathode termination, and a molding material. The solid electrolytic capacitor element defines an upper surface, lower surface, front surface, and rear surface, and includes an anode, dielectric layer overlying the anode, and a cathode overlying the dielectric layer that includes a solid electrolyte, and wherein an anode lead is electrically connected to the anode. The anode termination is electrically connected to the anode lead. The cathode termination is electrically connected to the cathode and contains an upstanding portion positioned generally perpendicular to the lower surface of the capacitor element and first and second planar portions positioned generally parallel to the lower surface of the capacitor element. The first and second planar portions are interconnected by a folded region such that the first planar portion is disposed vertically above the second planar portion. The molding material encapsulates the capacitor element and leaves exposed at least a part of the anode termination and at least a part of the second planar portion of the cathode termination.

In accordance with another embodiment of the present invention, a method for forming a capacitor from a capacitor element and a leadframe is disclosed. The leadframe contains an anode section and a cathode section, the anode section containing a base and a tab extending therefrom, and the cathode section containing a base and a tab, wherein the base of the cathode section has a first region and a second region, and wherein the tab of the cathode section extends from the second region of the base. The method comprises bending the tab of the anode section in an upwardly direction to form an upstanding anode termination portion; bending the tab of the cathode section in an upwardly direction to form an upstanding cathode termination portion; bending the first region of the base of the cathode section in an upwardly direction along a first fold axis and in a downwardly direction along a second fold axis to form a first planar cathode termination portion interconnected to a second planar cathode termination portion via a folded region, the folded region being defined between the first and second fold axes; positioning the capacitor element onto the leadframe; electrically connecting the anode lead of the capacitor element to the upstanding anode termination portion; electrically connecting the upstanding cathode termination portion, the first planar cathode termination portion, the second planar cathode termination, or a combination thereof, to the capacitor element; and encapsulating the capacitor element with a molding material so that a part of the second planar portion of the cathode termination remains exposed.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
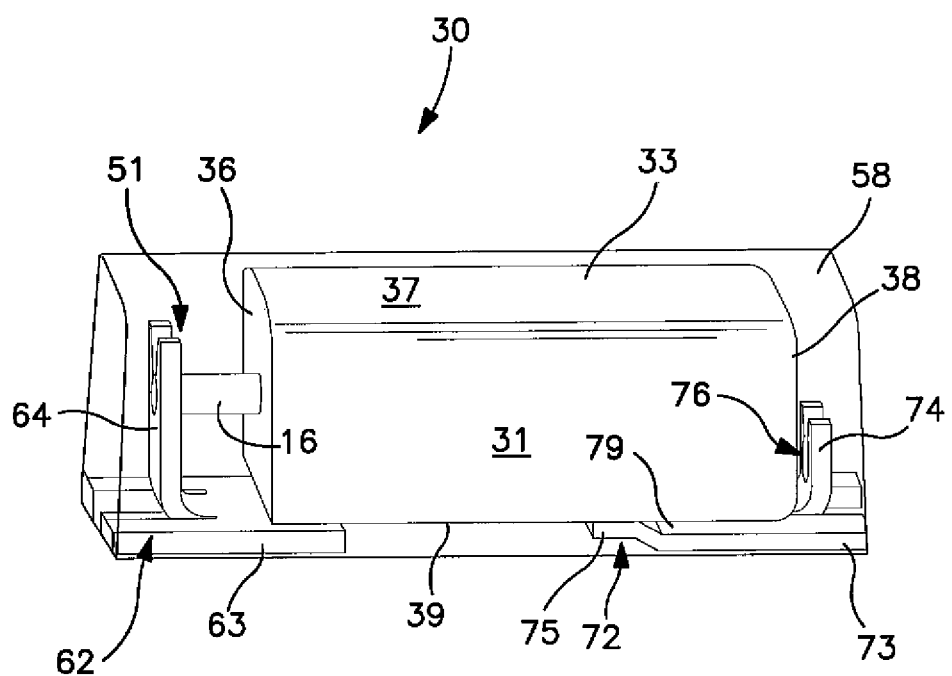
FIG. 1 is a perspective view of one embodiment of the electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a capacitor containing a solid electrolytic capacitor element that includes an anode, dielectric, and a cathode that includes a solid electrolyte. An anode lead extends from the anode and is electrically connected to an anode termination. Likewise, a cathode termination is electrically connected to the cathode. The cathode termination contains an upstanding portion that is oriented generally perpendicular to the lower surface of the capacitor element, and first and second planar portions that are oriented generally parallel to the lower surface of the capacitor. The first and second planar portions are interconnected by a folded region so that the first portion is positioned vertically above the second portion. Thus, after encapsulating the capacitor element with a molding material, the second planar portion remains exposed for subsequent connection to an electrical component. However, due to its higher vertical position, the first planar portion can be substantially encapsulated by the molding material. In addition, the upstanding portion of the cathode termination is also completely encapsulated by the molding material. By encapsulating both planar and upstanding portions of the cathode termination with the molding material, the present inventors have discovered that the likelihood of delamination is reduced even if a portion of the molding material cracks. This improves mechanical stability and electrical performance.

Figure 2:
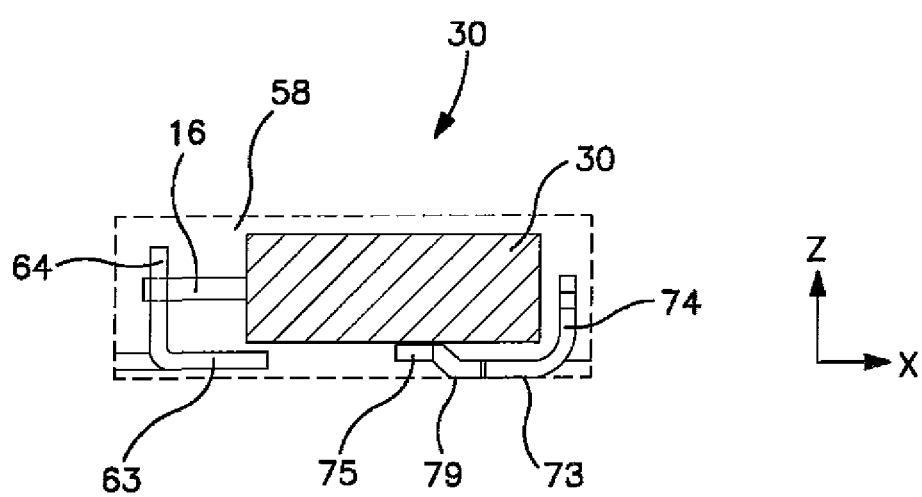
FIG. 2 is a cross-sectional view of one embodiment of the electrolytic capacitor of the present invention.

Referring to FIGS. 1-2, one embodiment of a capacitor 30 is shown that includes an anode termination 62 and a cathode termination 72 in electrical connection with a capacitor element 33 having an upper surface 37, lower surface 39, front surface 36, rear surface 38, side surface 31, and an opposing side surface (not shown). Although not specifically shown, the capacitor element 33 contains an anode, dielectric, and solid electrolyte. The anode may be formed from a valve metal composition having a high specific charge, such as about 5,000 μF*V/g or more, in some embodiments about 25,000 μF*V/g or more, in some embodiments about 40,000 μF*V/g or more, and in some embodiments, from about 70,000 to about 200,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. In addition to the techniques described above, any other technique for constructing the anode body may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

An anode lead 16 (e.g., wire, sheet, etc.) is also electrically connected to the anode. The lead 16 is typically formed from any electrically conductive material, such as tantalum, niobium, nickel, aluminum, hafnium, titanium, etc., as well as oxides and/or nitrides of thereof. The manner in which the lead 16 is connected may vary as is known in the art, such as by coupling the lead using resistance or laser welding, embedding the lead into the anode body during its formation (e.g., prior to sintering), etc. In the illustrated embodiment, for example, the lead 16 is in the form of an embedded wire that extends from the front surface 36 of the capacitor element 33.

Once constructed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric layer is formed, a protective coating may optionally be applied, such as one made of a relatively insulative resinous material (natural or synthetic). Such materials may have a specific resistivity of greater than about 10 $\Omega \cdot cm$, in some embodiments greater than about 100, in some embodiments greater than about 1,000 $\Omega \cdot cm$, in some embodiments greater than about $1 \times 10^5 \Omega \cdot cm$, and in some embodiments, greater than about $1 \times 10^{10}$ $\Omega/cm$. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

A conductive polymer coating may also be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. The conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating.

In one particular embodiment, the conductive coating contains a substituted polythiophene, which is π-conjugated and has intrinsic electrical conductivity (e.g., electrical conductivity of at least about 1 $\mu S\ cm^{-1}$). The substituted polythiophene may have recurring units of general formula (I), formula (II), or both:

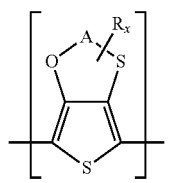

(I)

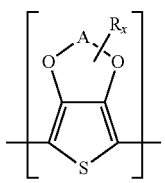

(II)

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable substituted polythiophenes are those in which "A" is an optionally substituted $C_2$ to $C_3$ alkylene radical and x is 0 or 1. In one particular embodiment, the substituted polythiophene is poly(3,4-ethylenedioxythiophene) ("PEDT"), which has recurring units of formula (II), wherein "A" is $CH_2$—$CH_2$ and "x" is 0. The monomers used to form such polymers may vary as desired. For instance, particularly suitable monomers are substituted 3,4-alkylenedioxythiophenes having the general formula (III), (IV), or both:

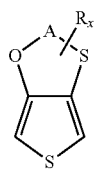

(III)

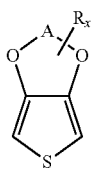

(IV)

wherein, A, R, and X are as defined above.

Examples of such monomers include, for instance, optionally substituted 3,4-ethylenedioxythiophenes. One commercially suitable example of 3,4-ethylenedioxthiophene is available from H.C. Starck GmbH under the designation Clevios™ M. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium (III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron (III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H.C. Starck GmbH under the designation Clevios™ C.

Various methods may be utilized to form the conductive coating. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, monomer may initially be mixed with the oxidative catalyst to form a precursor solution. Once the mixture is formed, it may be applied and allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

In addition to or in conjunction with coating that are formed by in situ application, a conductive coating may also be employed that is in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene corresponds referred to the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the part. Nevertheless, the average thickness of the coating generally falls within the ranges noted above.

The conductive polymer coating may optionally be healed. Healing may occur after each application of a conductive polymer layer or may occur after the application of the entire conductive polymer coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the part may optionally be applied with an external coating. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

Regardless of the manner in which it is formed, the resulting capacitor element 33 is provided in electrical contact with the anode termination 62 and cathode termination 72, as mentioned above and shown in FIGS. 1-2. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The cathode termination 72 contains a first planar portion 75 and second planar portion 73 that are relatively flat and positioned substantially parallel to the lower surface 39 of the capacitor element 33. The first planar portion 75 and the second planar portion 73 are interconnected by a folded region 79, which may be oriented at an angle of from about 0° to about 90°, and in some embodiments, from about 10° to about 50°, relative to the longitudinal direction in which the anode lead 16 extends (See e.g., the −x direction of FIG. 2). In this manner, the first planar portion 75 is positioned vertically above the second planar portion 73 in the −z direction (See FIG. 2).

The first planar portion 75 may be in direct contact with the lower surface 39, or they may be connected thereto via an adhesive, soldering material, a weld, insulating material (e.g., plastic pad or tape), etc. Although the second planar portion 73 need not be connected to the lower surface 39, it may nevertheless optionally be connected via an adhesive, soldering material, a weld, insulating material (e.g., plastic pad or tape), etc. In one embodiment, for example, the first planar portion 75 is in direct contact with the lower surface 39 and the second planar portion 73 is connected to the lower surface 39 via a conductive adhesive. In another embodiment, the first planar portion 75 is connected to the lower surface 39 via a conductive adhesive and the second planar portion 73 is not connected to the lower surface 39. In yet another embodiment, the first planar portion 75 is connected to the lower surface 39 via a conductive adhesive and the second planar portion 73 is connected to the lower surface 39 via an insulating material.

Regardless, the cathode termination 72 also contains an upstanding portion 74 that is positioned substantially perpendicular (e.g., 90°±10°) to the lower surface 39 of the capacitor element 33 and to the planar portions 73 and 75. The upstanding portion 74 is in electrical contact and substantially parallel to the rear surface 38 of the capacitor element 33. Optionally, the upstanding portion 74 may define an aperture 76 that facilitates its ability to be folded during manufacture of the capacitor. Although depicted as being integral, it should also be understood that the planar, folded, and upstanding portions may alternatively be separate pieces that are connected together, either directly or via an additional conductive element (e.g., metal).

The manner in which the anode termination is connected to the capacitor element is not critical. For example, in FIGS. 1-2, the anode termination 62 is shown as containing a planar portion 63 that is relatively flat and positioned substantially parallel to the lower surface 39 of the capacitor element 33 and an upstanding portion 64 that is positioned substantially perpendicular (e.g., 90°±10°) to the planar portion 63. As shown, the upstanding portion 64 also defines a slot 51 for receiving the anode lead 16. The slot 51 may have any of a variety of different shapes and/or sizes. In the illustrated embodiment, for example, the slot 51 has a "U-shape" for further enhancing surface contact and mechanical stability of the lead 16.

Figure 3:
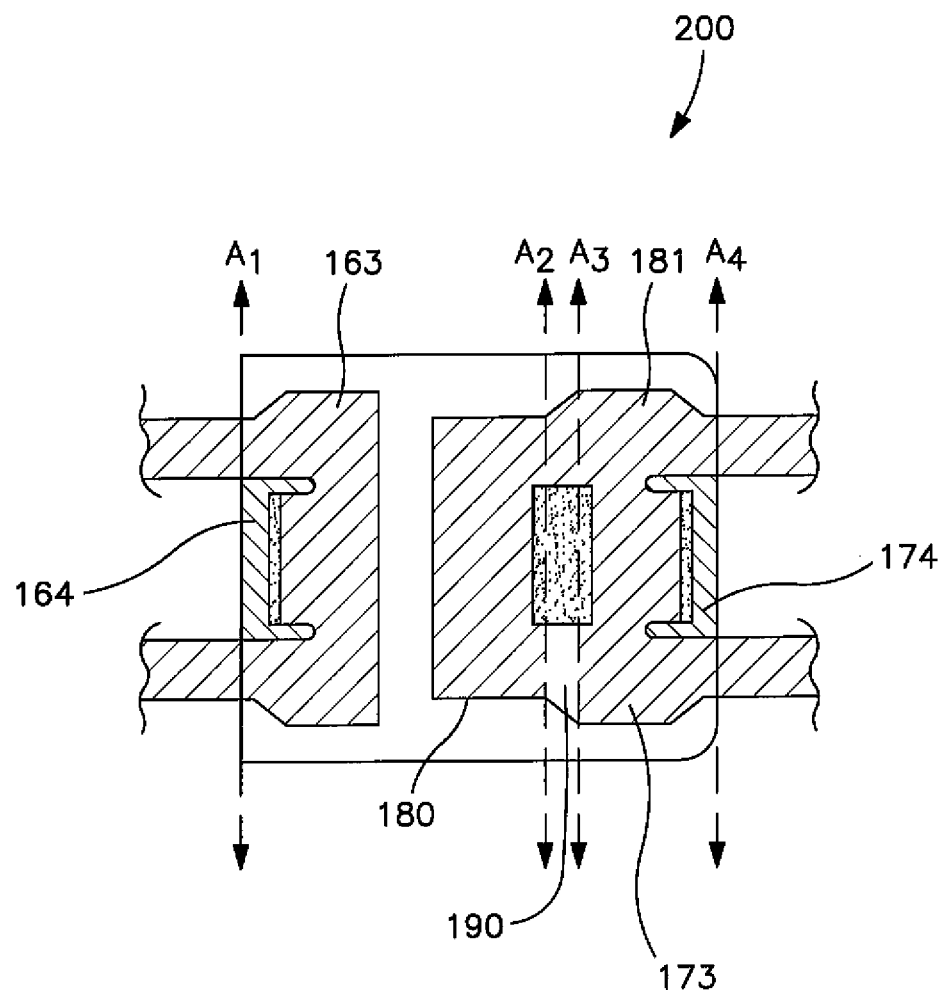
FIG. 3 is a top view of a leadframe that may be employed in one embodiment of the present invention.

An exemplary manner in which the capacitor element 33 is attached to a leadframe 200 containing anode and cathode sections is shown in FIG. 3 and will now be described in more detail. For sake of simplicity, the formation of only a single capacitor will be described. It should be understood, however, that the leadframe may contain multiple sections that are cut into individual capacitor assemblies. Referring to FIG. 3, a portion of the leadframe 200 is shown that contains anode and cathode sections that eventually form the anode and cathode terminations, respectively, as described above. It should be understood that only a portion of the leadframe is shown, and that it will generally contain other components not expressly shown. For example, the sections may be initially connected via a metal sheet that is subsequently removed during manufacture of the capacitor.

The leadframe 200 of FIG. 3 is shown in an initial "flat" configuration. In this embodiment, the anode section is formed from a base 163 and a tab 164 extending therefrom. The tab 164 may be bent upwardly along a fold axis "$A_1$" to form the upstanding portion 64 and the U-shaped slot 51.

(FIGS. 1-2). The cathode section is likewise formed from a base 173 and a tab 174 extending therefrom. The tab 174 may be bent upwardly along a fold axis "$A_4$" to form the upstanding portion 74. To form the first and second planar portions 75 and 73, the base 173 is folded twice. More particularly, a front region 180 of the base 173 is initially folded upwardly along axis "$A_2$" and then downwardly along axis "$A_3$" until it is generally parallel to the rear region 181 of the base 173, which remains unfolded. In this manner, the front region of the base 173 will constitute the first planar portion 75 and the rear region will constitute the second planar portion 73 (FIGS. 1-2). A portion 190 of the leadframe 200 located between the fold axes "$A_2$" and "$A_3$" likewise forms the fold region 79 that interconnects the first and second planar portions 75 and 73, respectively.

Referring again to FIGS. 1-2, once the terminations are bent into the desired configuration, the capacitor element 33 is positioned thereon so that the anode lead 16 is received by the slot 51. The lower surface 39 of the capacitor element 33 rests on the planar portion 63 of the anode termination 62 via an insulating material (not shown), which electrically isolates the anode and cathode terminations. The lower surface 39 also rests on the first planar portion 75 of the cathode termination 72, either directly or via an additional material (e.g., conductive adhesive). The anode lead 16 may then be electrically connected to the slot 51 using any technique known in the art, such as mechanical welding, laser welding, conductive adhesives, etc. Upon electrically connecting the anode lead 16, any optional conductive adhesives may be cured. For example, a heat press may be used to apply heat and pressure to ensure that the capacitor element 33 is adequately adhered to the cathode termination 72 by the adhesive.

Once attached to the leadframe, the capacitor element may be encapsulated with a molding material 58 (FIGS. 1-2), such as an epoxy resin, silica, or any other known encapsulating material. The width and length of the case may vary depending on the intended application. Suitable casings may include, for instance, "A", "B", "F", "G", "H", "J", "K", "L", "M", "N" "R", "S", "T", "W", "Y", or "X" cases (AVX Corporation). Regardless of the case size employed, the capacitor element 33 is encapsulated so that at least a portion of the anode and cathode terminations 62 and 72 are exposed for mounting onto a circuit board. In the embodiment illustrated in FIGS. 1-2, for example, the planar portion 63 of the anode termination 62 is exposed, but the upstanding portion 64 is encapsulated within the molding material 58. Likewise, at least a part of the second planar portion 73 of the cathode termination 72 is also exposed, such as at least a part of a lower surface of the second planar portion 73, but the first planar portion 75 and the upstanding portion 74 are both encapsulated within the molding material 58. Further, it should be understood that the molding material extends from the lower surface 39 of the capacitor element 33 to the lower surface of the second planar portion 73, even though at least a part of the lower surface of the second planar portion 73 is exposed. As explained above, the encapsulation of a planar and upstanding portion of the cathode termination can result in a capacitor having better mechanical stability and thus improved electrical performance.

The present invention may be better understood by the following examples.

Test Procedures

Equivalent Series Resistance ("ESR")

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 25° C. and at the rated voltage after a minimum of 60 seconds,

EXAMPLE 1

A tantalum anode (2.30 mm×0.50 mm×2.30 mm) was initially anodized at 17.1V in a liquid electrolyte to 150 μF. A conductive polymer coating was then formed by dipping the anode into a butanol solution of iron (III) toluenesulfonate (CLEVIOS™ C) for 15 minutes and consequently into 3,4-ethylenedioxythiophene (CLEVIOS™ M) for 1 minute. After 45 minutes of polymerization, a thin layer of poly(3,4-ethylenedioxythiophene) was formed on the surface of the dielectric. The parts were washed in methanol to remove reaction by-products, re-anodized in a liquid electrolyte, and washed again in methanol. The polymerization cycle was repeated 12 times. The parts were then coated by graphite and silver as is known in the art. The resulting capacitor element was then placed in a pocket of a leadframe to form anode and cathode terminations as shown in FIGS. 1-2. More particularly, as shown in FIG. 1, the resulting cathode termination contained a first planar portion 75 and second planar portion 73 that were interconnected by a folded region 79, and an upstanding portion 74. Once positioned in the desired manner, the anode wire was welded to the anode termination using a pulsed laser beam. The capacitor element was then encapsulated within an "L" case having a length of about 3.50 mm, a height of about 1.00 mm, and a width of about 2.80 mm. The finished part was treated with lead-free reflow. 756 parts were made by the method described above.

EXAMPLE 2

Capacitors were formed in the manner described in Example 1, except that the cathode termination contained only a single planar portion. That is, the cathode termination lacked the planar portion 75 and folded region 79 shown in FIG. 1. Instead, the cathode termination simply contained a single planar portion adjacent to the lower surface of the capacitor element and an upstanding portion adjacent to the rear surface of the capacitor elements. 756 parts were made by this method. The parts of Examples 1 and 2 were then subjected to electrical testing. The median results are set forth below in Table 1.

TABLE 1

| | Electrical Performance | | |
|---|---|---|---|
| | DCL [μA] | ESR [mOhm] | Cap [μF] |
| Example 1 | 36.2 | 120 | 147.2 |
| Example 2 | 51.9 | 159 | 145.1 |

As indicated, the parts assembled using a cathode termination as described in Example 1 had a lower leakage current and ESR than the parts of Example 2. Further, more than 97% of the parts of Example 1 were determined to pass the electrical performance testing, as compared to only 91% of the parts of Example 2. It is believed that the low yield was due to the fact that the anode was not positioned symmetrically within the case, which led to a higher likelihood of delamination from the cathode termination.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor comprising:
    a solid electrolytic capacitor element that defines an upper surface, lower surface, front surface, and rear surface, wherein the capacitor element includes an anode, dielectric layer overlying the anode, cathode overlying the dielectric layer that includes a solid electrolyte, and an anode lead electrically connected to the anode that extends from the front surface in a longitudinal direction;
    an anode termination that is electrically connected to the anode lead; and
    a cathode termination that is electrically connected to the cathode and contains an upstanding portion positioned generally perpendicular to the lower surface of the capacitor element and adjacent to the rear surface of the capacitor element and first and second planar portions positioned generally parallel to the lower surface of the capacitor element, wherein the first and second planar portions are interconnected by a folded region such that the first planar portion is disposed vertically above the second planar portion, and wherein the second planar portion has a lower surface, and further wherein the first planar portion is adhered to the capacitor element with a conductive adhesive and the second planar portion is not adhered to the capacitor element with a conductive adhesive; and
    a molding material that encapsulates the capacitor element and leaves exposed at least a part of the anode termination and at least a part of the lower surface of the second planar portion of the cathode termination, wherein the first planar portion and the upstanding portion of the cathode termination are completely encapsulated by the molding material, and further wherein the molding material extends to the lower surface of the second planar portion.

2. The capacitor of claim 1, wherein the first and second planar portions are positioned adjacent to the lower surface of the capacitor element.

3. The capacitor of claim 1, wherein the first planar portion is in direct contact with the capacitor element.

4. The capacitor of claim 1, wherein the folded region is oriented at an angle of from about 10° to about 50° relative to the longitudinal direction.

5. The capacitor of claim 1, wherein the anode termination contains an upstanding portion positioned generally perpendicular to the lower surface of the capacitor element and a planar portion positioned generally parallel to the lower surface of the capacitor element.

6. The capacitor of claim 5, wherein the anode lead is electrically connected to the upstanding portion of the anode termination.

7. The capacitor of claim 6, wherein an insulating material is disposed between the capacitor element and the planar portion of the anode termination.

8. The capacitor of claim 6, wherein the upstanding portion of the anode termination defines a slot for receiving the anode lead.

9. The capacitor of claim 1, wherein the anode includes tantalum, niobium, or an electrically conductive oxide thereof.

10. The capacitor of claim 1, wherein the solid electrolyte includes a conductive polymer.

11. The capacitor of claim 10, wherein the conductive polymer is poly(3,4-ethylenedioxythiophene).

* * * * *